Dec. 19, 1933.                R. J. GARTNER                 1,940,123
                        CLUTCH CONTROLLED BRAKE LOCK
                            Filed Dec. 3, 1931

Inventor
R. J. Gartner
By Frease and Bishop
    Attorneys

Patented Dec. 19, 1933

1,940,123

UNITED STATES PATENT OFFICE 1,940,123

CLUTCH CONTROLLED BRAKE LOCK

Raymond J. Gartner, Canton, Ohio, assignor of one-third to Samuel L. Bowius and one-third to Clarence F. Frank, both of Canton, Ohio Application December 3, 1931. Serial No. 578,702

5 Claims. (Cl. 192—13)

My invention relates to automobile brake locks controlled by operation of the clutch pedal, and more particularly to a brake lock operated by the suction created in the intake manifold of the engine of the automobile.

Present day automobiles are provided with a clutch operating pedal and a brake operating pedal arranged side by side and adapted to be actuated by the feet of the operator. The clutch pedal is frequently operated without movement of the brake pedal, and the brake pedal is often operated without moving the clutch pedal.

In coming to a stop, however, both pedals are usually depressed, and if such a stop is made on an ascending grade, the automobile will start to move backward as soon as the foot is removed from the brake pedal to operate the accelerator for speeding the engine.

Under such conditions, it is necessary to use the emergency brake until the clutch pedal is released, or to operate the throttle by a hand control lever; and these methods are not only awkward, but obviously very dangerous. Owing to the difficulty of properly synchronizing the operation of the foot brake with the engagement of the clutch, the automobile is usually moving backwardly as the clutch becomes engaged, with the result that the automobile starts forward abruptly and a shock is imparted to the driving members thereof.

Accordingly, it is an object of the present invention to provide means operated by depressing both the clutch and brake pedals, for holding the brake pedal depressed when the operator's foot is transferred therefrom to the accelerator, which means automatically and smoothly releases the brake pedal as the clutch pedal is manually released.

Another object is to provide clutch control brake locking means which does not interfere with the separate operation of the clutch and brake pedals.

A further object is to provide clutch control brake locking means connected with the intake manifold of the automobile engine, so as to utilize the suction created therein by the normal operation of the engine.

Another object is to provide means connected with the intake manifold and operated by fully depressing the clutch pedal and initially depressing the brake pedal for assisting in further depressing the brake pedal.

A still further object is to provide means connected with the intake manifold for building a reserve vacuum which functions to temporarily operate the brake locking means if the engine is stalled when both pedals are depressed.

And finally, it is an object of the present invention to combine all of the foregoing advantageous features in a simple, compact and inexpensive apparatus which may be readily installed on any standard make of automobile.

These and other objects are attained by the improvements comprising the present invention, which may be stated in general terms as including a vacuum cylinder having one end communicating with the atmosphere, a piston in the cylinder operatively connected to the brake pedal, valve means operatively connected to the clutch pedal for selectively connecting the other end of the cylinder with the atmosphere or with the intake manifold of the engine, and a reservoir located between the valve means and the intake manifold.

Referring to the drawing forming part hereof

Similar numerals refer to similar parts throughout the several views.

Figure 1:
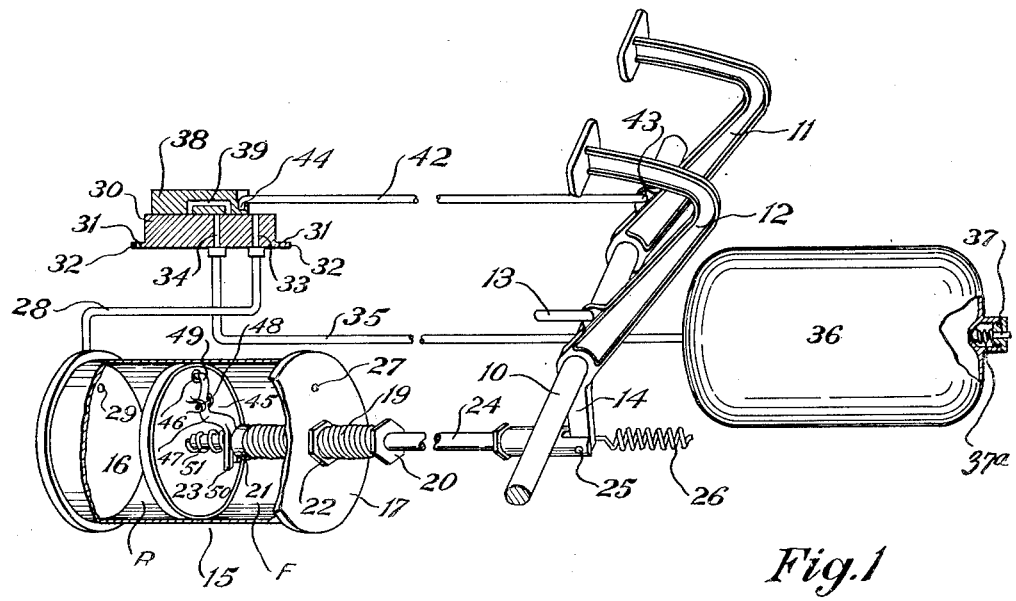
Figure 1 is a more or less diagrammatic perspective view of the improved apparatus, showing some of the parts in section and the brake and clutch pedals in normal position.
Figure 2:
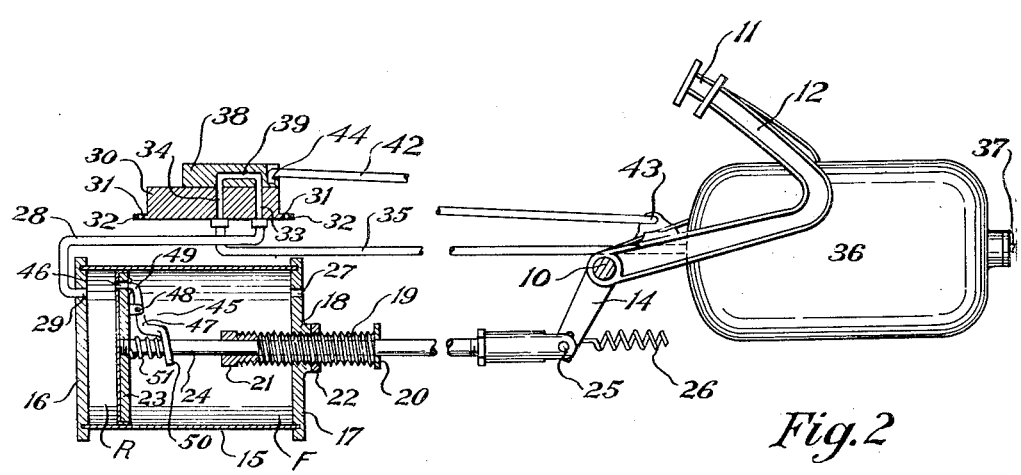
Fig. 2 is a sectional view similar to Fig. 1, showing the pedals both depressed.
Figure 3:
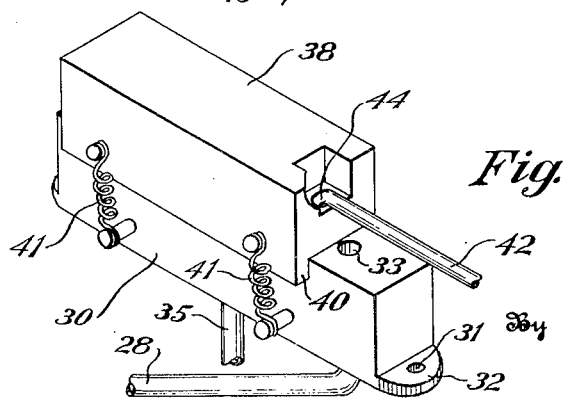
Fig. 3 is an enlarged perspective view of the improved valve means.

Referring to the drawing, the shaft 10 is operatively connected to the clutch (not shown) of the automobile, in the usual manner, and a clutch pedal 11 may be keyed thereon, so that movement of the pedal 11 to the right as viewed in Figs. 1 and 2 will disengage the clutch from driving engagement with the flywheel of the engine.

The brake pedal 12 may be rotatably mounted on the shaft 10, and has connected thereto a brake operating rod 13, whereby movement of the pedal 12 to the right will apply the brakes of the automobile in the usual manner. A lever arm 14 preferably extends from the pedal lever 12 below the shaft 10.

The improved means for locking the brake pedal 12 in operative position when both the clutch and brake pedals are depressed, preferably includes a vacuum cylinder 15, which is mounted on the frame of the automobile in any convenient manner. The cylinder 15 is provided with end walls 16 and 17, and the end wall 17 has an axially located internally threaded boss 18 thereon, through which an externally threaded bushing 19, having a smooth bore, is screwed.

The bushing 19 is preferably provided at its outer end with a nut 20 for adjusting the bushing relative to the end wall 17, and the inner end 21 of the bushing 19 extends into the cylinder 15 for a purpose to be hereinafter described. A lock nut 22 may be provided between the boss 18 and nut 20 for locking the bushing in adjusted position.

A piston 23 is slidably mounted in the cylinder 15 and has secured thereto a piston rod 24 which is journaled through the bore of the bushing 19. The piston rod 24 is operatively connected with the brake pedal arm 14 as by the pivotal connection 25, whereby depression of the pedal 12 to the right moves the piston 23 to the left, as shown in Fig. 2. A spring 26 may be connected between the pivotal connection 25 and the automobile frame in the usual manner for urging the brake pedal toward its normally inoperative position shown in Fig. 1.

The end wall 17 is preferably provided with a vent 27, and the piston 23 divides the cylinder 15 into a forward chamber F communicating with the atmosphere through vent 27 and a rearward chamber R.

Preferably, a pipe 28 communicates with the chamber R through end wall 16 as at 29, and the pipe 28 is connected at its outer end with a stationary valve block 30, which may be connected to the frame of the automobile as by bolts passing through holes 31 provided in lugs 32.

The pipe 28 is connected with a passage 33 preferably extending through the block 30 at its longitudinal axis. Spaced from passage 33 and located at the longitudinal axis of the block, another vertical passage 34 preferably extends through block 30.

A pipe 35 is connected at one end to passage 34 and at its other end to a reservoir 36. The reservoir 36 is connected to the intake manifold (not shown) of the engine by a pipe 37. A spring pressed ball check valve 37a is provided at the connection between pipe 37 and reservoir 36, for the purpose of permitting flow through the reservoir to the intake manifold and preventing flow from the intake manifold to the reservoir.

The capacity of reservoir 36 is such that, when a substantial vacuum is created therein, it is capable of maintaining a substantial vacuum in closed chamber R for two or three minutes.

Means for selectively connecting the closed end R of cylinder 15 with the atmosphere or reservoir 36, preferably includes a valve member 38 slidably mounted on the stationary valve block 30. The member 38 is provided with an inverted U-shaped passage 39, the ends of which are adapted to register with passages 33 and 34 in one position of the member 38, as shown in Fig. 2.

The member 38 is provided with depending flanges 40, which slidably engage the sides of block 30, and tension springs 41 may be connected between the sides of members 30 and 38, respectively, for maintaining a close sliding contact between the abutting surfaces of the valve members.

Means for operatively connecting the sliding valve member 38 to the clutch pedal 11 may include a rod 42, pivotally connected at one end with the pedal 11, as at 43, and having a substantially universal connection with the member 38, as at 44.

As shown in Fig. 1, when the clutch pedal 11 is in normal inoperative position, the member 38 closes off passage 34 and uncovers passage 33 to the atmosphere.

A relief valve indicated generally at 45 is preferably provided in the piston 23 and provides communication between the chamber R and the chamber F of the cylinder, and the relief valve may include an aperture 46 extending through the wall of the piston 23. A relief valve closure lever 47 is preferably pivoted on the rod side of the piston, as at 48, and adapted at its outer end 49 to enter aperture 46 for sealing the same. The inner end of the lever 47 is provided with a yoke 50 which is located around the piston rod 24, and a spring 51 is located around the piston rod 24 between the yoke 50 and piston 23 for urging the end 49 of the lever to valve closing position.

As shown in Fig. 1, when the brake pedal 12 is in normal inoperative position, the spring 26 will pull the piston 23 to the right against bushing 19, the end 21 thereof acting as a stop to force the yoke 50 of the lever 47 toward the piston against the action of spring 51 and hold the relief valve 45 in open position.

In the operation of the apparatus, assuming the parts to be in the position shown in Fig. 1, if the operator depresses the clutch pedal 11 to disengage the clutch, the valve member 38 will move to the position shown in Fig. 2, with the U-shaped passage 39 in register with passages 33 and 34. If the engine is running, the intake manifold will suck air from chamber R through pipe 28, passage 39, pipe 35 and reservoir 36.

Withdrawal of air from chamber R will cause air to flow from chamber F through relief valve 45, since that valve is held open by stop 21, and a corresponding amount of air will flow into chamber F through vent 27, with the result that the piston 23 remains stationary. Thus the clutch may always be operated independently of the brake.

If, on the other hand, the brake pedal 12 is depressed, the piston 23 will move to the left, as shown in Fig. 2, moving yoke 50 away from stop 21 and permitting spring 51 to close the relief valve 45. This movement of piston 23 with valve 45 closed forces air in chamber R out through pipe 28. Since the valve member 38 is maintained in the position shown in Fig. 1 by the clutch pedal, air in chamber R will be forced out through passage 33 to the atmosphere, with the result that atmospheric pressure is maintained on both sides of the piston, and when the brake pedal 12 is released, the spring 26 will return the pedal and piston 23 to normal inoperative position as shown in Fig. 1.

When the automobile is brought to a stop, both the clutch and brake pedals are depressed, and the parts assume the positions shown in Fig. 2. With the engine running, the intake manifold will suck air out of chamber R through pipe 28, passage 39, pipe 35 and reservoir 36. Since the relief valve is closed because of the initial movement of the piston 23 by the brake pedal, the substantial vacuum set up in chamber R will assist in further depressing the brake pedal so as to require less exertion by the operator, and the vacuum will then hold the piston in a position similar to that indicated in Fig. 2, so that the brake pedal is maintained in brake locking position. If the automobile is brought to a stop on an ascending grade, the operator may transfer his foot from the brake pedal to the accelerator while holding the clutch pedal down with his other foot, in order to put the car in gear, and then start it forward by releasing the clutch pedal. As soon as the clutch pedal is released, passage 33 will be opened to the atmosphere and air will rush into chamber R to gradually and smoothly force piston 23 to the right and release the brakes.

Consequently, the operator of an automobile having the improved clutch controlled brake lock may come to a complete stop on a grade, and start forward again in the usual manner without using the hand throttle lever or emergency brake. The automobile cannot move backward before the clutch becomes engaged, and when the clutch is engaged the car starts forward gradually, no shock being imparted to the driving members. Thus, smoother driving operation is attained, resulting in greater comfort, and safety to the occupants of the automobile.

The reservoir 36 functions to hold the brake pedal in depressed position, should the engine become stalled when the automobile is brought to a stop with both pedals depressed. While the engine is running a substantial vacuum is always maintained in the reservoir due to its connection with the intake manifold, and if the engine is stalled, the capacity of the reservoir is such as to maintain a substantial vacuum in chamber R so as to hold the brake pedal in depressed position for some two or three minutes. This gives the operator ample time to start his engine, shift gears and start the car forward without keeping his foot on the brake pedal.

The improved apparatus is simple, compact and inexpensive, and may be readily installed on any standard make of automobile. The present improved brake lock insures safety, comfort, and driving ease; as well as promoting longer life to the driving members of the automobile.

I claim:

1. In combination with an engine having an intake manifold, a clutch pedal and a brake pedal, a cylinder having one end communicating with the atmosphere, a piston slidable in the cylinder and operatively connected to the brake pedal, valve means operatively connected to the clutch pedal for selectively connecting the other end of the cylinder with the atmosphere or the intake manifold, a relief valve in the piston for providing communication between both ends of the cylinder, means acting to normally close the relief valve, and means for opening the relief valve when the brake pedal is in normal inoperative position.

2. In combination with an engine having an intake manifold, a clutch pedal and a brake pedal, a cylinder having one end communicating with the atmosphere, a piston slidable in the cylinder and operatively connected to the brake pedal, valve means operatively connected to the clutch pedal for selectively connecting the other end of the cylinder with the atmosphere or the intake manifold, a relief valve in the piston providing communication between both ends of the cylinder, a spring normally maintaining the relief valve in closed position, and means for opening the relief valve when the brake pedal is in inoperative position.

3. In combination with an engine having an intake manifold, a clutch pedal and a brake pedal, a cylinder having one end communicating with the atmosphere, a piston slidable in the cylinder and operatively connected to the brake pedal, valve means operatively connected to the clutch pedal for selectively connecting the other end of the cylinder with the atmosphere or the intake manifold, a relief valve in the piston providing communication between both ends of the cylinder, means acting to close the relief valve, spring means for normally holding the brake pedal in inoperative position, and stop means for opening the relief valve when the brake pedal is inoperative.

4. In combination with an engine having an intake manifold, a clutch pedal and a brake pedal, a cylinder having one end communicating with the atmosphere, a piston slidable in the cylinder and operatively connected to the brake pedal, a valve, pipes connecting the other end of the cylinder and the intake manifold to the valve, means operatively connecting the valve to the clutch pedal whereby movement of the pedal operates the valve to connect the other end of the cylinder with the intake manifold, a relief valve in the piston providing communication between both ends of the cylinder, a relief valve closure lever pivotally mounted on the piston, spring means normally maintaining said lever in position to close the relief valve, and means for moving the lever to open position when the brake pedal is inoperative.

5. In combination with an engine having an intake manifold, a clutch pedal and a brake pedal, a cylinder having one end communicating with the atmosphere, a piston slidable in the cylinder and operatively connected to the brake pedal, valve means operatively connected to the clutch pedal for selectively connecting the other end of the cylinder with the atmosphere or the intake manifold, a relief valve for providing communication between both ends of the cylinder, means acting to normally close the relief valve, and means for opening the relief valve when the brake pedal is in normal inoperative position.

RAYMOND J. GARTNER.